(12) United States Patent
Elber (10) Patent No.: US 7,248,257 B2
(45) Date of Patent: Jul. 24, 2007

(54) LOW BANDWIDTH TRANSMISSION OF 3D GRAPHICAL DATA

(75) Inventor: Gershon Elber, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 1047 days.

(21) Appl. No.: 09/901,611

(22) Filed: Jul. 11, 2001

(65) Prior Publication Data

US 2002/0109681 A1 Aug. 15, 2002

Related U.S. Application Data

(60) Provisional application No. 60/268,417, filed on Feb. 14, 2001.

(51) Int. Cl.
*G06T 15/00* (2006.01)

(52) U.S. Cl. ............. 345/419; 345/418; 345/441; 345/442; 382/232; 382/233; 382/236; 382/241; 382/248; 358/426.16; 375/240.12; 375/240.24; 375/240.26

(58) Field of Classification Search ............ 345/418, 345/419, 441, 442; 382/232, 233, 236, 241, 382/248; 358/426.16; 375/240.12, 240.24, 375/240.26, 246
See application file for complete search history.

(56) References Cited

U.S. PATENT DOCUMENTS

| | | | |
|---|---|---|---|
| 4,772,947 A * | 9/1988 | Kono | 375/240.24 |
| 6,101,277 A * | 8/2000 | Go | 382/236 |
| 6,256,038 B1 * | 7/2001 | Krishnamurthy | 345/419 |
| 6,487,312 B2 * | 11/2002 | Kostrzewski et al. | 382/232 |
| 6,525,722 B1 * | 2/2003 | Deering | 345/419 |
| 6,559,842 B1 * | 5/2003 | Deering et al. | 345/420 |
| 6,680,976 B1 * | 1/2004 | Chen et al. | 375/240.26 |

OTHER PUBLICATIONS

Demmel, Applied Numerical Linear Algebra, 1997, http://www.siam.org, Chapter 3.*

Lyche et al., "Knot removal for parametric curves and surfaces," Elsevier Science Publishers B.V., pp. 217-230.*

* cited by examiner

Primary Examiner—Kimbinh T. Nguyen (57) ABSTRACT

A graphical data-compressor for compressing received arbitrary graphical data for subsequent transmission; where the graphical data-compressor comprises an input for receiving the received arbitrary graphical data, the input being linked to an analyzer for analysis of the received arbitrary graphical data into constituent geometrical parts, the analyzer being linked to an analytic scene describer, for description of said constituent geometrical parts as an analytic description of the received arbitrary graphical data, the analytic scene describer being linked to a transmitter, the transmitter being for transmission of the analytic description.

49 Claims, 7 Drawing Sheets

Fig. 7

LOW BANDWIDTH TRANSMISSION OF 3D GRAPHICAL DATA

RELATIONSHIP TO EXISTING APPLICATIONS

The present application claims priority from U.S. Provisional Patent Application No. 60/268,417 filed Feb. 14, 2001.

FIELD OF THE INVENTION

The present invention relates to a means and associated method for compressing arbitrary graphical information, for example in order to facilitate transmission over a network.

BACKGROUND OF THE INVENTION

Computer graphics applications tend to be data heavy, in that they generally require very large amounts of data to enable the graphical scenes associated therewith to be correctly rendered for viewing. This is especially true for applications involving virtual reality with moving scenes. 3D environments, where changes of viewing position may require redrawing of both the background and foreground objects displayed thereon are particularly data intensive. In general, the more accurately that the appearance of a 3D scene reflects reality, the more data is required to define it and the more effort is required to manipulate the data and render it into a displayable form.

Figure 1:
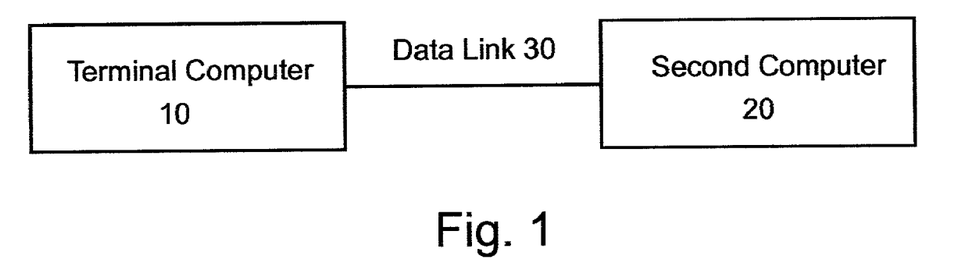
FIG. 1 is a simplified block diagram illustrating two computers, connected by a data link.
Figure 2:
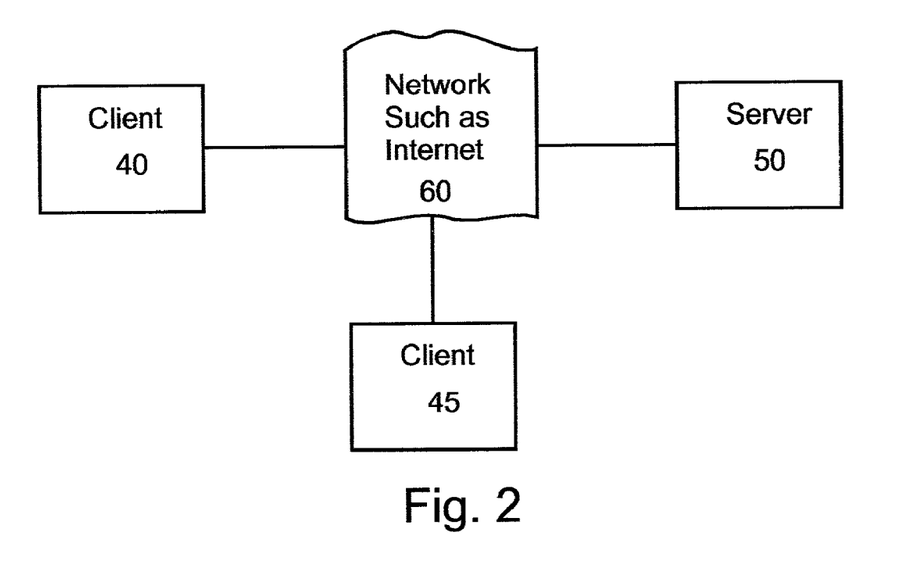
FIG. 2 is a simplified block diagram illustrating client and server computers, linked by network such as the Internet.

As illustrated in FIGS. 1 and 2, networked computing comprises computers interacting via a data link. This can be generalized to a plurality of remote computer terminals, interacting with the same computer application via a network. The computers are often at a considerable distance from each other.

Where an application permits a plurality of users to view the same graphic interface, and where each terminal interface is updated with respect to interactions in real time, at least the changes to the currently viewed scene may require to be transferred to each terminal via the network. A change to an element within a dynamically changing scene such as a rotation, translation or transformation thereof generally requires the element to be redrawn. Sometimes changes may require regeneration of a whole scene, that is, the whole scene display may require redrawing.

Now the speed at which a computer application runs is a function of its complexity and the capability of the hardware. In networked computing however, particularly with data-intensive, heavy applications, the speed at which applications run, is often limited by the time required for necessary data to be transferred between computers. This data transfer time is a function of the bandwidth of the data transfer lines, and of the volume of data that requires transporting.

For networked computing in general, there is a desire to limit the quantity of data that is transported between computers, and efficient programming and data compression techniques are used to facilitate this data limiting. Some of these methods are specific to certain types of data. For example, some methods of data compression work best with text. Many graphical data compression techniques are most effective when dealing with 2D data, and only a few specific methods are suitable for 3D graphical data.

The Internet is a multiple-user, computing environment that potentially allows many users to interact with each other using the same application, enabling many players to play the same adventure game for example. To facilitate multiplayer interaction in a 3D virtual graphic environment in real-time, it is required that changes or moves made by one user, are transmitted to other users fast enough that correct sequencing is maintained, and preferentially the moves of one player appear instantaneously on the monitors of all other players. Achieving real-time updating of high-resolution 3D graphical displays at a plurality of user terminals is a challenging aim.

Apart from games and the like, virtual reality has also been applied to a variety of areas of human endeavor to simulate reality where, due to economic, safety and other considerations, it has been deemed preferable to use simulations rather than the real thing. Examples of this include prototyping objects of manufacture using computer aided design programs, anatomical simulations of the human body for pedagogic purposes in the training of doctors and surgeons, flight simulators for training aircraft pilots, and battlefield simulation for training military personnel such as tank drivers and gunners.

Now virtual reality often features changes in the appearance of virtual scene elements, perhaps as a result of rotation of objects represented, a change in viewing angle, or a change in position or movement of the object due perhaps to a user interaction. There may be a demand for fast scene regeneration, preferably in real time, and this puts a limitation on the amount of processing to affect the change. Particularly in networked computing, where the data defining an scene may require transferring between nodes on the network, there may be a requirement to limit the amount of data required to define the appearance of scene elements.

The common approach to giving an acceptable 3D appearance to a virtual scene on a 2D visual display unit (VDU), is to construct the 3D surface from elements and objects from which the scene is comprised of, namely polygonal facets. A polygonal facet is a flat element bounded by a closed loop. The boundary of the polygonal facet may be defined by the XYZ coordinates of the vertices thereof. In addition to representing a surface by polygonal facets, geometry can also be represented by polynomial and rational functions including piecewise polynomial and piecewise rational functions, and many solid-modeling environments extensively use freeform polynomial and rational curves and surfaces for defining shapes. Freeform functions can additionally be used for modeling objects whose shapes are comprised from simple geometrical elements. For example, geometric computer aided design (CAD), computer aided manufacturing (CAM) and Computer Aided Engineering (CAE) packages represent cylinders, spheres, cones and other simple geometrical shapes as rational equations, using Bezier and B-spline forms. Defining objects by rational equations is generally more compact than the multiple polygon faceted form that is typically used in virtual reality environments.

Further details concerning Bezier curves and associated methods may be obtained from Gerald Farin, Curves and Surfaces for CAGD, A Practical Guide, $4^{th}$ Edition. Academic Press, N.Y., 1997, the contents of which are hereby incorporated by reference.

Higher data compression can be achieved, if, where appropriate, shapes and forms, or pieces thereof are represented as standard geometrical solid types, giving a size, position and orientation thereof in space. Thus a screen object representing, say, a tin can, may be compactly represented as being a cylinder having a certain position in space, a certain orientation and height, and a certain radius, that is in the analytical form: cylinder $X_{Point}$ $Y_{Point}$ $Z_{Point}$ $X_{dir}$ $Y_{dir}$ $Z_{dir}$ R where ($X_{Point}$, $Y_{Point}$, $Z_{Point}$) are the coordinates of a selected point associated with the cylinder such as the center of the base thereof, or the centroid thereof, $(X_{dir}, Y_{dir}, Z_{dir})$, define both the height of the cylinder and the orientation of its axis, and R is the radius of the cylinder. The above analytical representation is not limited to shapes that can be adequately modeled as basic primitives however. More complex shapes may often be represented as comprising a plurality of basic primitives. Thus, a bucket with a handle may be represented as an inverted truncated cone, the handle thereof being represented by an arc, perhaps a section of a circumference, for example. Such high-level representation has been considered for the compact transmission of geometry, see Shmueli and Elber [Shmueli O., and Elber G., An Architecture for Data Interaction Using Three Dimensional Environments, CS Technion Technical Report, CIS9623, Technion, December 1996], the contents of which are incorporated herein by reference. However, for virtual reality applications, such representation is generally unsuitable as the interfacing between the processor and the VDU at the client site is generally handled by dedicated graphics hardware circuitry for speed, and this hardware is specially adapted to handling polygons. Thus for non-polygonal data representations, more work is required at the client site to convert the geometry into a polygonal, displayable form.

A set of data points or function in two dimensions can be fitted with a polynomial of a suitable order. Where the required polynomial is of a particularly high order, a more practical approach than using a single approximating polynomial is to use splines. Splines are smooth piecewise polynomials that can be used to represent functions over large intervals. Because splines are smooth and easy to manipulate, they have become a standard tool for modeling arbitrary functions. The spline model is often used when the function to be modeled is only given as the solution of a functional equation.

A well-known type of spline is the NURBS, the name being an acronym of Non-Uniform Rational B-splines. Using NURBS is a popular method for representing curve and surface geometry in such diverse industries as Computer aided design (CAD), Computer aided manufacturing CAM, Computer aided engineering CAE, computer graphics, entertainment and 3-D animation, medical and geosciences.

High-level graphical representations are not highly portable between platforms. Nevertheless, Elber and Kim [Elber G., Kim M. S., Geometrical Shape recognition of Freeform Curves and Surfaces. Graphical Models and Image Processing, Vol. 59, No. 6, p.p. 417-433, November 1997] have demonstrated that higher level graphical representations may be recovered, using matching techniques, from B-splines, surfaces, curves etc. and may be transferred, between different solid modeling systems. Elber and Kim's approach uses tools from differential geometry, and carries out a process of reverse engineering to identify B-Splines or any other piecewise polynomial, and/or rational function. Having identified such a function, it then attempts to detect underlying shapes. Underlying shapes are detected by formulating necessary and sufficient conditions for a freeform curve to be a line or a circle. The approach also formulates the necessary and sufficient conditions for a freeform surface to be planar, spherical, a circular cone, a circular cylinder, a surface of revolution, a ruled surface, an extrusion surface or a sweep surface and may be extended to other shapes as well.

By way of example, suitable conditions for a rational planar curve to be circular are now given:

Let E(t) be the evolute of planar parametric curve C(t). (An evolute is the envelope of normals to a given curve, or, in other words, the locus of the centers of curvature).

$E(t)=C(t)+N(t)/\kappa(t)$ where N(t) is the normal field of C(t) and $\kappa(t)$ is the curvature of C(t). Then C(t) is circular, if E(t) degenerates into a single point.

It is further shown in Elber and Kim, that if C(t) is rational, then so is E(t), But then given C(t), one can evaluate E(t) as a rational form, say using B-spline representation, and examine all the control points of E(t) for similarity. If E(t) does degenerate into a single point, then C(t) is circular.

Similar approaches, also described by Elber and Kim, formulate the necessary and sufficient conditions for a freeform surface to be planar, spherical, a circular cone, a circular cylinder, a surface of revolution, a ruled surface, an extrusion surface or a sweep surface. These conditions are then used in similar robust algorithms that determine whether one of a predetermined list of shapes is present, and which may be used for the geometrical shape recognition of these basic lines and shapes. The shapes may then be used as basic primitives for analyzing the form of solid objects. Elber and Kim have thus shown the feasibility of improved transfer of geometric data between CAD platforms.

Another challenge is the conversion of low-level geometry into a high level description, particularly the conversion of low-level polygonal geometry into polynomial and rational forms. Although generally difficult, sometimes, such as when using the output from a 3D scanner, the problem is greatly simplified. The output of 3D scanners is generally an ordered set of point clouds. Instead of converting this point cloud into a mesh of polygonal data, the point cloud may be represented as a B-spline surface representing coarse information, and a pixel map holding the finer details. This approach was suggested by Krishnamurthy and Levoy [Krishnamurthy V. and Levoy M., Fitting Smooth Surfaces to Dense Polygonal Meshes, Computer Graphics Proceedings, Annual Conference Serious, Siggraph, August 1996, pp. 313-324, New Orleans, La.], the contents of which are hereby incorporated by reference. Alternatively, interpolation methods may be used on the set of unordered points or triangulations, and Farin has discussed interpolation methods of this type [Gerald Farin, Curves and Surfaces for CAGD, A practical guide, $4^{th}$ Edition, Academic Press, New York, 1997], the contents of which are hereby incorporated by reference.

Finally, there have been some efforts made at the representation of 3D objects as high level polynomials and functional forms in order to achieve compact transmission of geometrical data, as discussed by Shmueli and Elber [Shmueli O. and Elber G., An Architecture for Data Interaction using three Dimensional Environments, CS Technion Technical Report, CIS9623, Technion, Haifa, Israel, December 1996], the contents of which are hereby incorporated by reference. By "functional" is meant the representation of a geometric entity by a procedural description of a basic geometrical form describing the entity followed by the parameters of the entity, thus providing the information needed for reconstruction of the entity. Shimueli and Elber describe a system for downloading and transmitting high-level polynomial descriptions to remote user sites, for display by a graphics system on a screen. The transformation is both fast and efficient, and highly detailed virtual scenes such as offices and show rooms may be transmitted in this manner using only dozens of kilobytes of data.

SUMMARY OF THE INVENTION

It is an aim of the present embodiments to allow arbitrary graphical data supported by a computer, to be analyzed using mathematical functions to create a compressed form that may be efficiently transmitted to remote computers for subsequent rendering.

It is a further aim of the present embodiments to compress the transmitted data still further, by preferably recognizing the objects or their constituent parts as basic primitives, and other pre-selected shapes and forms, and transmitting those pre-selected shapes and forms in a compressed manner.

According to a first aspect of the present invention there is thus provided a graphical data-compressor for compression of received, arbitrary graphical data for subsequent transmission; said graphical data-compressor comprising an input for reception of said received arbitrary graphical data, an analyzer linked to said input and operable for analysis of said received arbitrary graphical data into constituent geometrical parts, a scene describer, linked to said analyzer for description of at least some of said constituent geometrical parts as a functional description of said received arbitrary graphical data, and a transmitter linked to said functional scene describer for transmission of said analytic description.

Preferably, there is further provided an indexer positioned between said analyzer and said transmitter, for indexing said analytic description into an indexed description.

Preferably, said arbitrary graphical data is in a format selected from a polygonal graphic representation, a point cloud representation, an ordered piecewise linear mesh and polynomial, rational and freeform functions.

Preferably, said analyzer, for analysis of said graphical data into constituent geometrical parts, comprises a pattern matcher Preferably, said constituent geometrical part is a predetermined shape, and said analytic description comprises a functional representation of said predetermined shape.

Preferably, said functional representation comprises a basic underlying shape together with parameters.

Preferably, said received arbitrary input data comprises a plurality of data points in space.

Preferably, said input comprises an applicator for applying a surface fitting function to fit said plurality of data points in space, thereby to represent said plurality of data points in a format suitable for said analyzer.

Preferably, said surface fitting function is selected from any one of a group comprising Bezier freeform functions, B-spline freeform functions, NURBS, piecewise polynomial equations and rational equations.

Preferably, said predetermined shape is selected from any one of a group comprising lines, curves, planar freeform surfaces, surfaces of revolution, spherical faces, conical faces, cylindrical faces, torroidal faces, ruled surfaces, extrusion surfaces, sweep surfaces, additive combinations thereof and trimmed combinations thereof.

Preferably, said scene describer is operable to select said predetermined shape for said constituent geometrical part by analysis of said constituent geometric part to determine fulfillment of conditions associated with said predetermined shape.

Preferably, said predetermined shape is modifiable by trimming.

Preferably, said functional description comprises at least a label of an underlying shape and parameters for adapting said underlying shape to reconstruct an original shape.

Preferably, said parameters comprise at least one of a group comprising an orientation, a scale, dimensional parameters and a location.

Preferably, said label is an index.

According to a second aspect of the present invention there is provided a graphics decompressor comprising a receiver for reception of graphical data in a compressed, functional form, a geometry evaluator, following said receiver, for evaluation of said graphical data in respect of a predetermined set of basic shapes stored at said decompressor, and a piecewise linear surface approximator following said geometry evaluator, for reconstruction of said evaluated data on a piecewise basis, into geometrical entities.

Preferably, said compressed functional form comprises elements having a basic shape associated with parameters.

Preferably, said reconstruction into geometrical entities is at a selectable resolution level.

Preferably, said resolution level is selectable in accordance with a context of the data within a scene.

Preferably, the context is a relationship of the data to a background and a foreground within the scene.

Preferably, the selectable resolution level is determinable by available computer resources, for example memory availability, processor capability, and available processing time.

Preferably, said predetermined shape is selected from a list comprising lines, curves, planar freeform surfaces, surfaces of revolution, spherical faces, conical faces, cylindrical faces, torroidal faces, ruled surfaces, extrusion surfaces and sweep surfaces.

Preferably, each of said basic shapes in said set are trimmable with a further basic shape from said set.

According to a further aspect of the present invention there is provided an analytic form describer, for describing constituent geometrical parts of arbitrary graphical data as an analytic description; said analytic form describer comprising:

a register of predetermined basic geometrical elements, and an analytic form fitter for associating said predetermined basic geometrical elements with said geometrical parts.

Preferably, said predetermined basic geometrical elements are selected from a group comprising lines, circles, planar surfaces, spherical surfaces, conical surfaces, cylindrical surfaces, torroidal surfaces, surfaces of revolution, ruled surfaces, extrusion surfaces and sweep surfaces, and additive and trimmed combinations thereof.

Preferably, said analytic form fitter further comprises functionality for fitting said constituent geometrical parts of arbitrary graphical data with functions selected from a group comprising B-splines, Bezier functions, and/or polynomial and piecewise polynomial or rational equations.

According to a further aspect of the present invention there is provided a system for analysis, compression, transmission and decompression of arbitrary graphical data, the system comprising:

a graphical data-compressor for compression of received, arbitrary graphical data, said graphical data-compressor comprising:

an input for reception of arbitrary graphical data, an analyzer, linked to said input, for analysis of said received arbitrary graphical data into constituent geometrical parts, a describer, linked to said analyzer, for description of said constituent geometrical parts as an analytic description, a transmitter, linked to said analyzer, for transmission of said analytical description over a data link;

said system further comprising a graphical data decompressor for decompression of said functional description into geometric entities, the decompressor comprising:

a receiver for reception of said functional description from said data link, and a geometry evaluator for evaluating said functional description in terms of basic geometric shapes, thereby to decompress said compressed graphical data descriptions.

The system preferably further comprises an indexer linked between said analyzer and said transmitter, said indexer for indexing said analytic description into an indexed description.

Preferably, said decompressor further comprises a piecewise linear surface approximator.

Preferably, said data link is selected from a group comprising: a LAN, WAN, the Internet, a dedicated land link, a dedicated link through the atmosphere, a radio-wave link, and a microwave link.

According to a further aspect of the present invention there is provided a method for compressing arbitrary graphical data comprising:

analyzing said arbitrary graphical data into constituent geometrical parts, describing said constituent geometrical parts as functional description of said constituent geometrical parts of said arbitrary graphical data, and transmitting said functional description.

The method preferably further comprises indexing said functional description into an indexed description prior to transmission.

Preferably, said arbitrary graphical data is received as a representation selected from a polygonal graphic representation, a point cloud representation and an ordered piecewise linear mesh Preferably, said analyzing said arbitrary graphical data into constituent geometrical parts comprises pattern matching.

Preferably, said describing comprises representing by functional representation.

Preferably, said arbitrary geometrical data comprises a plurality of data points.

Preferably, said describing comprises matching with a predetermined shape.

Preferably, said matching with a predetermined shape comprises matching with a shape selected from a group comprising: lines, curves, planar freeform surfaces, surfaces of revolution, spherical faces, conical faces, cylindrical faces, torroidal faces, ruled surfaces, extrusion surfaces and sweep surfaces and additive and trimmed combinations thereof.

Preferably, said matching further comprises modifying said predetermined shape by trimming.

Preferably, said compressing comprises encoding as a label and parameters.

Preferably, said encoding further comprises labeling with a label selected from a predetermined index of labels.

According to a further aspect of the present invention there is provided a method for decompressing a functional description of graphical data, said functional description being in terms of basic shapes and associated parameters, the method comprising:

evaluating said functional description in terms of said plurality of basic geometrical shapes, and generating geometric entities using said evaluation.

Preferably, said generating comprises converting said evaluated functional format into a piecewise linear surface approximation.

The method preferably further comprises converting said piecewise linear surface approximation into polygonal geometry.

According to a further aspect of the present invention there is provided a graphical data-compressor for compression of received, arbitrary graphical data for subsequent transmission; said graphical data-compressor comprising an input for reception of said received arbitrary graphical data, an analyzer linked to said input and operable for analysis of said received arbitrary graphical data into constituent geometrical parts, a scene describer, linked to said analyzer for description of at least some of said constituent geometrical parts as a functional description of said received arbitrary graphical data, and a geometrical part compressor operatively associated with said scene describer and said analyzer, for reduction of constituent geometric parts not described by said describer, into a reduced quantity of data.

Preferably, said geometrical part is expressible as at least one spline having knots and wherein said geometrical part compressor comprises a knot remover for identifying and removing knots having no effect on reproduction of the part.

Additionally or alternatively, said geometrical part is expressible as at least one spline having knots, the geometrical part compressor having a pattern identifier for identifying patterns of knots and an indexer for replacing each identified pattern with an index.

Additionally or alternatively the geometrical part compressor comprises a least squares approximator reducing said geometrical part into a least squares approximation.

Additionally or alternatively, the geometrical part compressor has a minimal degree identifier and a reducer for reducing said object to give a minimal polynomial for correct reproduction of said part.

In this document, words such as solid, object, scene, environment and the like, refer to virtual solid, virtual object, virtual scene, virtual environment and the like, unless the context clearly implies otherwise.

Similarly, the term 'VDU' may refer to any display device, particular 2D computer monitors, such as liquid crystal displays (LCD), cathode ray tubes, image projectors and screen, and to any similar device. Likewise, the visual components of dedicated 3D immersion or virtual reality equipment are to be considered as within the ambience of this term.

Similarly, the term 'computer' is to be understood loosely, to include electronic devices for example, portable phones and TV sets, particularly when equipped for graphical, networked, interaction.

The present embodiments relate to objects in a graphical object-oriented environment. The word object as used herein, refers to an individual, identifiable item, or programming unit, particularly to an autonomous programming element or entity, with a well-defined role in the problem domain, and to all the functions and code associated with a programming element, including characteristics such as the shape and form of the object as displayed on the computer monitor, its color, and associated properties such as sounds, functions and the like.

The word 'converting' and variations thereof, as used herein refers to translating one representation of an object into another.

The word 'form' and variations thereof, as used herein, refer to the physical shape indicated by the graphical object.

The word 'rendering' and variations thereof, as used herein, refer to projecting the form of an object such that it may be displayed or printed. Shading, coloring and the like are not necessarily intended.

The word 'fitting' and variations thereof, as used herein, refer to the process of converting the forms of objects and parts thereof; into B-splines, Bezier functions, surfaces, triaviates and n-dimensional polynomials and/or other freeform functions.

The word 'recognizing' and variations thereof, as used herein, refer to the process of identifying forms of objects or B-splines, Bezier functions surfaces, triaviates and n-dimensional polynomials and/or other freeform functions as basic primitives or other preselected forms.

The word 'downloading' and variations thereof, as used herein, refer to transferring from a first computer to a second computer across a data link.

Embodiments disclosed herein are directed to the compression of graphical data on a first computer, so that they may be downloaded to a second computer, for subsequent decompression and display, where the objects are within scenes, within a virtual environment. The embodiments are particularly directed to allowing a plurality of remote users to download, render, and interact with a plurality of objects, within a virtual environment, in real time. In the preferred embodiments described herein, the downloading of 3D objects in 3D scenes is described.

It will be appreciated by the reader, that many of the features described herein for 3D virtual reality, may be applied in other embodiments to flat shapes, 2D objects, scenes and the like and to 4 and higher dimensions, mutatis mutandis.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified block diagram illustrating computers linked via a data link, and shows a terminal computer 10 connected to or 'logged on to' a second computer 20 via a data link 30. The present embodiments are directed to enabling the transmission of graphical data in a compact form between computers 10, 20 over a data link 30.

Reference is now made to FIG. 2, which is a simplified block diagram illustrating networked computing, showing two clients 40, 45, a server 50 and the Internet 60. Preferred embodiments are directed to allowing the transmission of graphical data in a compact form between clients and servers, and particularly in allowing the downloading from a server 40 of detailed graphical data representing 3D geometrical scenes, in a compressed form to logged on clients 40, 45 via a network, particularly the Internet 60. The Internet 60 allows computers of all types that are Internet enabled, to log onto servers 50. Thus client computers 40, 45, in a client 40, 45—server 50 relationship as may exist over the Internet 60 are such that the clients 40, 50 can only be expected to have general graphical capabilities.

Networked computing may comprise a plurality of remote terminals or clients 40, 45 interacting with the same computer application, the bulk of which usually runs on a host computer or server 50. The clients 40, 45 and the server 50 are interconnected via a network 60. The individual clients are often at a considerable distance from each other.

The embodiments of the invention related to herein, are directed to facilitating the transmission between two computers 10, 20 via a data link 30, of arbitrary graphical data representing the scenes that may comprise background and objects, in a compressed form such that the graphical data can be efficiently transmitted and decompressed for subsequent rendering, preferably in real time, by the remote clients. The scenes and objects may be two, three or n-dimensional, and the data link may be a network such as the Internet.

The word object as used herein, refers to the representation of surfaces and other geometric forms within scenes. It does not necessarily refer to ways of constructing computer programs, that is, the word object does not connote object oriented computing.

The bottleneck in graphical data transmission to remote clients via a data-link is usually the time required for transmission over the link, which is a function of both the bandwidth of the part of the data-link having the narrowest bandwidth, and of the quantity of data to be transmitted. The embodiments of the invention related to herein, are particularly directed to limiting the quantity of data requiring transmission to enable the transmission of graphical scenes, without unduly compromising the renderability of the data transmitted, such that the scene can be suitably rendered after transmission.

Figure 3:
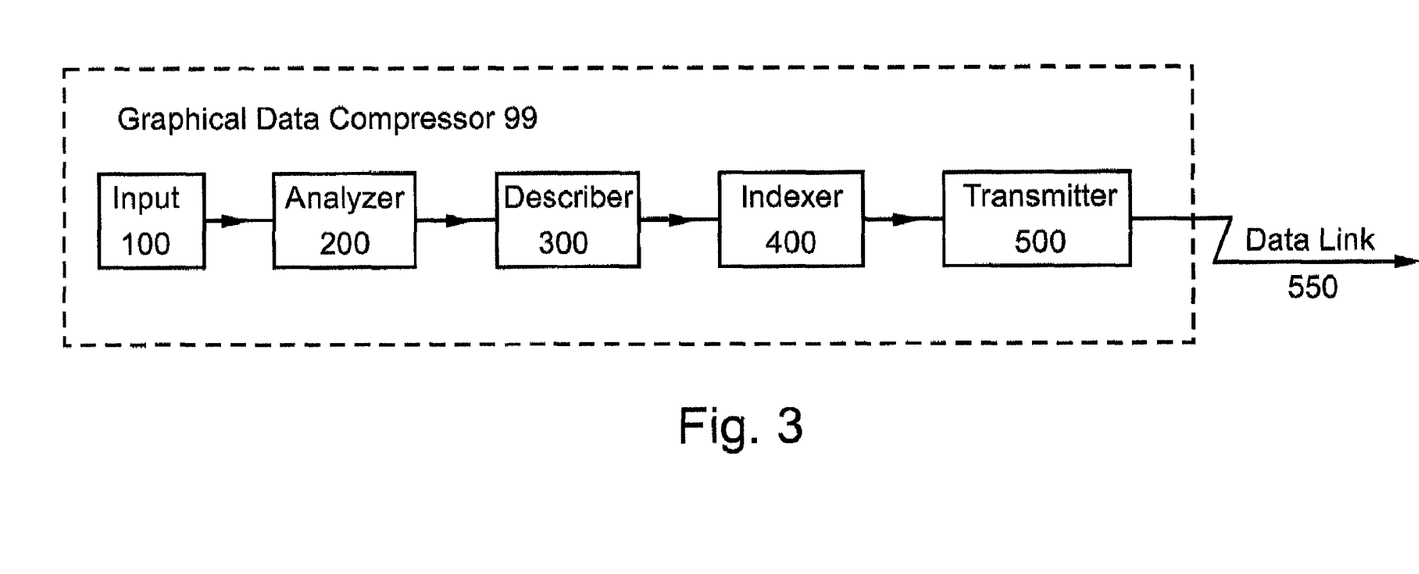
FIG. 3 is a functional block diagram of a graphical data compressor.

Reference is now made to FIG. 3, which is a functional block diagram of the first embodiment, henceforth, known herein as a graphical data compressor. The graphical data compressor 99 comprises an input 100, an analyzer 200, a describer 300, an indexer 400 and a transmitter 500. Referring to FIG. 2, the graphical data compressor may be supported by a server 50 having a server—client relationship with at least one client 40. In preferred embodiments, the server 50 may have a server—client relationship with a plurality of logged on clients 40, 45 connected by the Internet 60.

Arbitrary graphical data, which may be in the form of a polygonal graphics, a point cloud, an ordered piecewise mesh, or (piecewise) polynomial and rational forms for example, is input into the graphical data compressor 99. The analyzer 200, which may be a pattern recognizer for example, analyzes the arbitrary graphical data, into its constituent geometrical parts. A describer 300 then describes these constituent geometrical parts. If these constituent geometrical parts fulfill predetermined necessary and sufficient conditions to be preselected shapes and forms, such as basic primitives, the describer 300 recognizes them as such. If not, the describer 300 forwards the constituent geometrical parts unmodified. The operation of the describer 300 is described below with reference to FIG. 4. The geometrical part description is now further compressed by being indexed with an indexer 400, and then transmitted by a transmitter 500 over a suitable data link 550, for reception, decompression and rendering by logged on clients.

Figure 4:
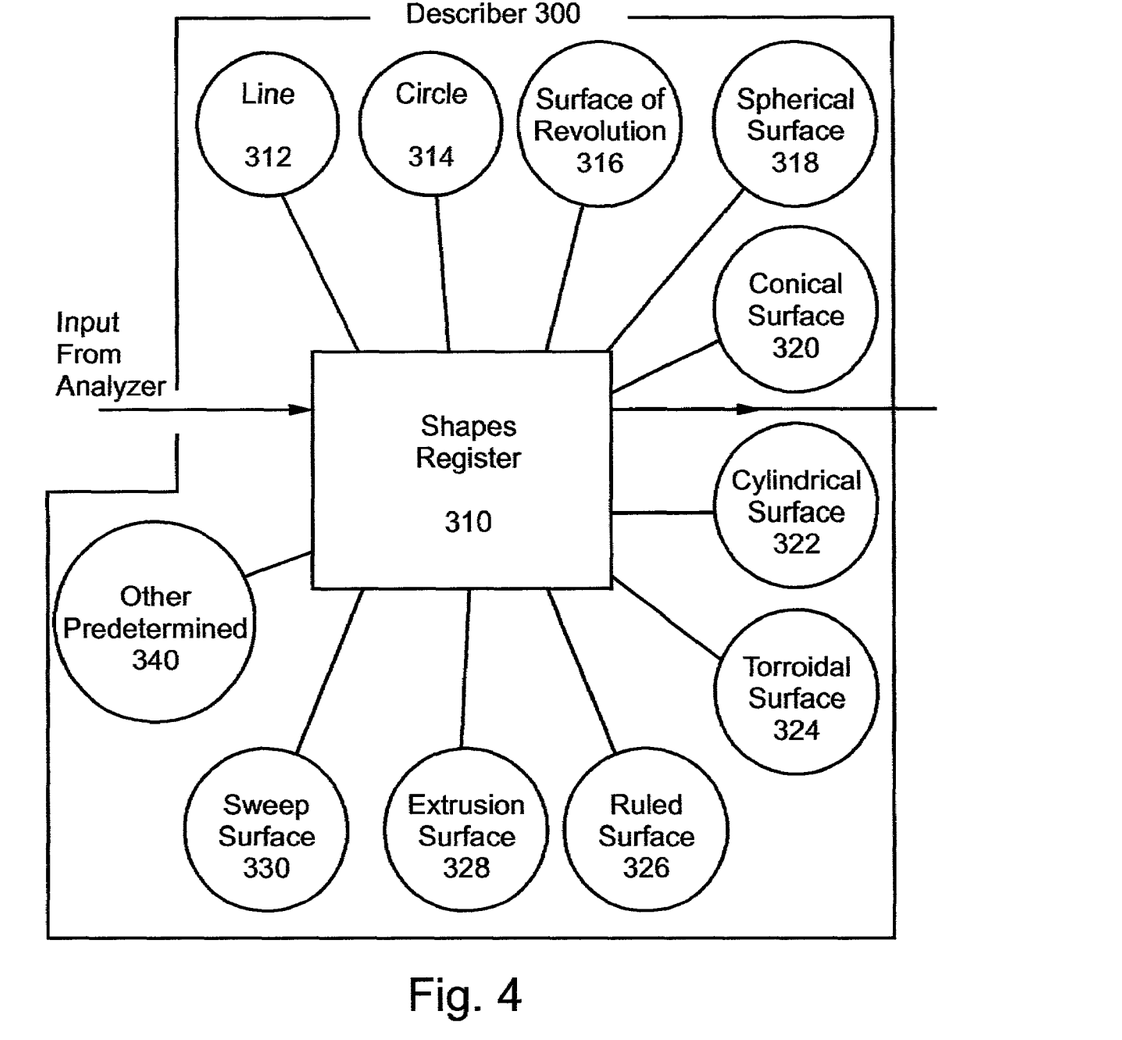
FIG. 4 is a functional block diagram detailing the describer part of the graphical data compressor.

With reference now to FIG. 4 which is a functional block diagram detailing the describer part of the graphical data compressor 99, the describer comprises a registers 310, which is a predetermined shapes and forms register 310.

The predetermined shapes and forms register 310 comprises a series of algorithms for recognizing freeform curves such as lines 312 and circles 314, and freeform surfaces such as planar surfaces, spherical surfaces 318, conical surfaces 320, cylindrical surfaces 322, torroidal surfaces 324, surfaces of revolution 316, ruled surfaces 326, extrusion surfaces 328 and sweep surfaces 330 using conditions for the respective shapes. It further comprises algorithms for recognizing any other predetermined shapes and forms 340. Where possible, the describer 300 describes a constituent geometrical part in terms of predetermined shapes and forms. The description is achieved, using the describer 300, by testing the constituent geometrical part against conditions for it being one of the predetermined shapes and forms, such that if a match is found, the constituent geometrical part is recognized as having that shape or form. One approach for doing this, described by Elber and Kim, uses tools based on differential geometry. To illustrate the above approach, by way of example, the necessary and sufficient conditions for a rational planar curve to be circular are now given:

Let E(t) be the evolute of planar parametric curve C(t), where an evolute is the envelope of normals to a given curve, or, in other words, the locus of the centers of curvature.

$E(t)=C(t)+N(t)/\kappa(t)$ where $N(t)$ is the normal field of $C(t)$ and $\kappa(t)$ is the curvature of $C(t)$. Then $C(t)$ is circular, if $E(t)$ degenerates into a single point.

As has been further shown in Elber and Kim, if $C(t)$ is rational, then so is $E(t)$. Given $C(t)$, one can evaluate $E(t)$ as a rational form, say using B-spline representation, and examine all the control points of $E(t)$ for similarity. If $E(t)$ degenerates into a single point, then $C(t)$ is circular; the query if $C(t)$ is circular is answered in a robust manner.

Elber and Kim give similar necessary and sufficient conditions for recognizing curves and surfaces as being other common shapes and forms as well. Their algorithms use differential geometry, but in principle other techniques for recognizing predetermined shapes and forms and thereby analyzing geometric data, may be used instead.

To provide greater flexibility, any of the predetermined shapes may be trimmed with one or more trimming curves to produce a greater variety of available shapes. For example, a dome could be represented as a trimmed sphere.

Geometrical data, originating from a contemporary geometrical CAD system for example, may comprise parts constructed originally from geometric constructors. In this case, the history of a component may be found in its internal saved data files, and using a suitable application programmable interface API, the describer 300, may be able to access hints that a given freeform surface is indeed a sphere or a ruled surface between two freeform curves for example.

Initial data may be presented to the system in a variety of formats and may need to be represented in a different way for the shape recognition to be effective. For example, an approximating function may be used. If the part is a point cloud representation, the point cloud may be processed into a form suitable for analysis by surface fitting using interpolation to pass through the points of the point cloud. Alternatively, a simpler function, that only approximately fits the points of the point cloud, provides a simpler and more manageable function. While approximate fits are less accurate than interpolating fits, they are generally considered more stable, and, because they are simpler, compression ratios achievable may be significantly higher.

Thus the describer describes the constituent geometrical parts of the input graphical data as basic primitive forms selected from a predetermined set of forms, the primitive forms being associated with parameters such as location, scale, orientation dimensions etc.

Referring back to FIG. 3, the description of the fitted/matched constituent geometrical part may be further compressed, by an indexer 400 which assigns it a code selected from an index, prior to transmission via a transmitter 500. A possible method of indexing, appropriate for this purpose, is to assign a predetermined range of basic primitives and curve and surface types with identification codes, which may be stored in a register previously downloaded to all logged on clients. In this manner, only the identification code and parameters require transmission. If, say, the form of a matched constituent geometrical part is described as a cylinder, it could be compressed and subsequently transmitted in the form cylinder $X_{point}$ $Y_{point}$ $Z_{point}$ $X_{dir}$ $Y_{dir}$ $Z_{dir}$ R where $(X_{point}, Y_{point}, Z_{point})$ are the coordinates of an identifiable, predetermined point on the cylinder, such as the center of the base thereof, or the centroid of the cylinder, R is the radius of the cylinder, and $(X_{dir}, Y_{dir}, Z_{dir})$ define both the height of the cylinder and the orientation of its axis. High-level representation of this nature, and further examples thereof are to be found in Shmueli and Elber as referenced previously.

Figure 5:
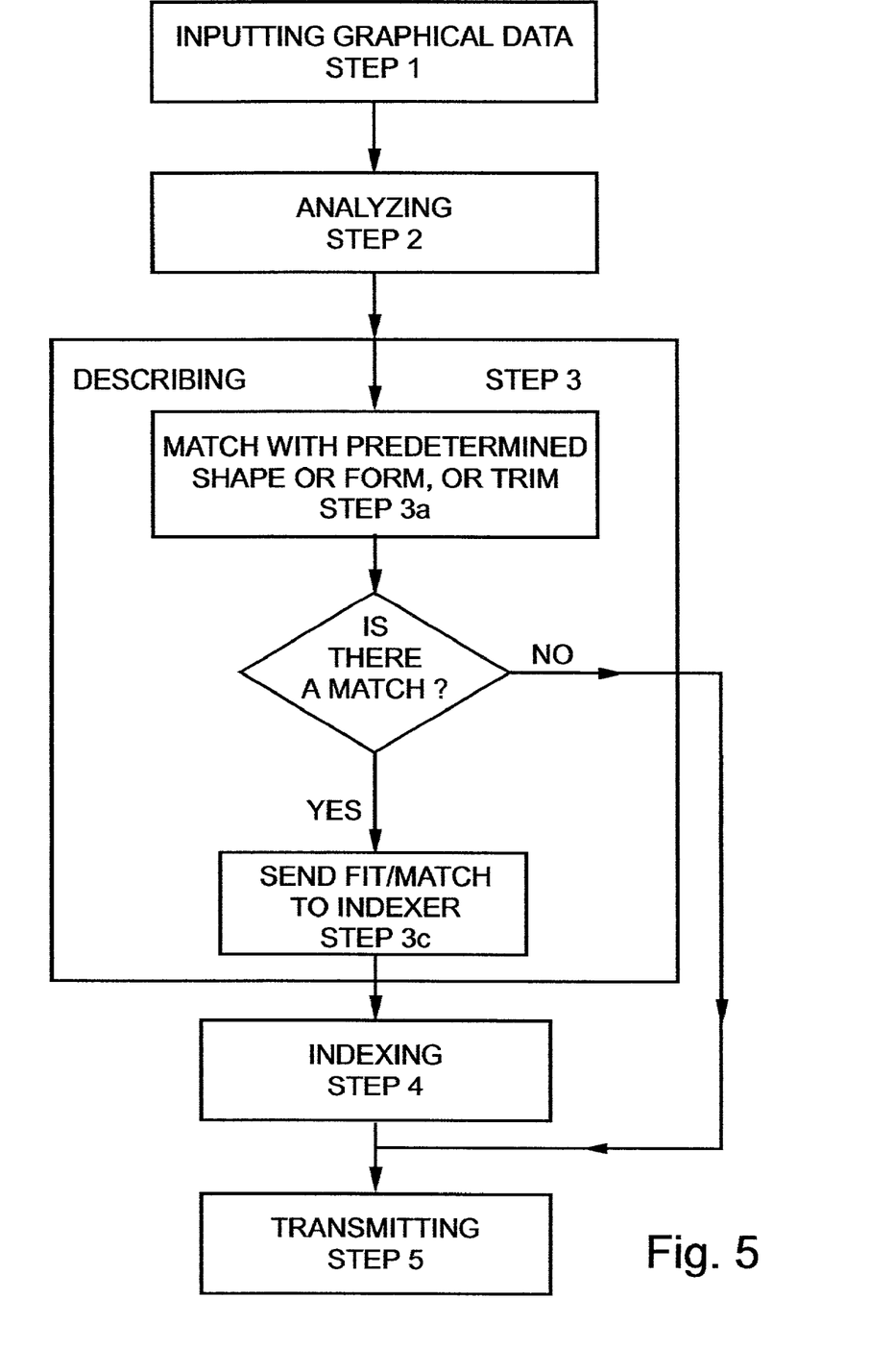
FIG. 5 is a flow diagram illustrating the process for the compression of arbitrary graphical data.

A typical process for using the graphical data compressor 601 is shown in FIG. 5 which is a simplified flow diagram illustrating the procedure for the compression of arbitrary graphical data, corresponding to the first embodiment.

The procedure for the compression of arbitrary graphical data comprises the following steps:

STEP 1—Inputting arbitrary graphical data in any of a range of supported forms such as polygonal graphics, point clouds, ordered piecewise meshes, or (piecewise) polynomial and rational forms for example.

STEP 2—Analyzing graphic data into constituent basic parts.

The analysis step may be achieved using a pattern matcher for example.

STEP 3—Describing the constituent basic parts. The describing process uses algebraic representations and algorithms to match the shapes to the most appropriate one of a predetermined set of forms and trims thereof.

Step 3 is now described in more detail. An attempt is made to match the piecewise graphical data from the analyzer with predetermined shapes, constructors, and forms, by comparing a graphical data element with each predetermined shape, constructor, or form that the describer can recognize, until either a match is found, or all predetermined shapes and forms recognizable by the describer have been attempted without success. These predetermined forms may include lines, circles, freeform surfaces such as planar surfaces, spherical surfaces, conical surfaces, cylindrical surfaces, torroidal surfaces, surfaces of revolution, ruled surfaces, extrusion surfaces and sweep surfaces and any other predetermined shapes and forms and trims of forms. Additions of two forms together are preferably treated is two forms and treated separately. If a match is found, the match is sent Step 3C to the indexer, for further compression by indexing Step 4. If no match is found, the graphical data is sent on to the next stage, typically transmission, unmodified.

It is also noted that a match could be made with a previously identified shape so that the present shape could be compressed into the form of a reference to the previous shape together with information to map the present shape from the previous shape, for example translation, reflection etc. For example the four wheels of a vehicle could be encoded by encoding one of the wheels as described above, then identifying that the three remaining wheels are the same and simply encoding a reference to the first wheel and the different location.

STEP 4—Indexing

The predetermined form matches and analytic functions of step 3 may be further compressed by indexing with a predetermined code selected from an index of codes representing the various predetermined forms and analytic function types. The predetermined code is essentially a list of labels to an index comprising the predetermined shapes and forms and analytical fitting functions supported by the describer. Thus if the piecewise graphical data was matched as being a circle, the compressed description/fit that is the output of the index would be a code representing a circle, and further details comprising the position of the center of the circle and its radius.

STEP 5—Transmitting

The compressed data is transmitted via a data link, for subsequent reception at appropriate destinations.

Figure 6:
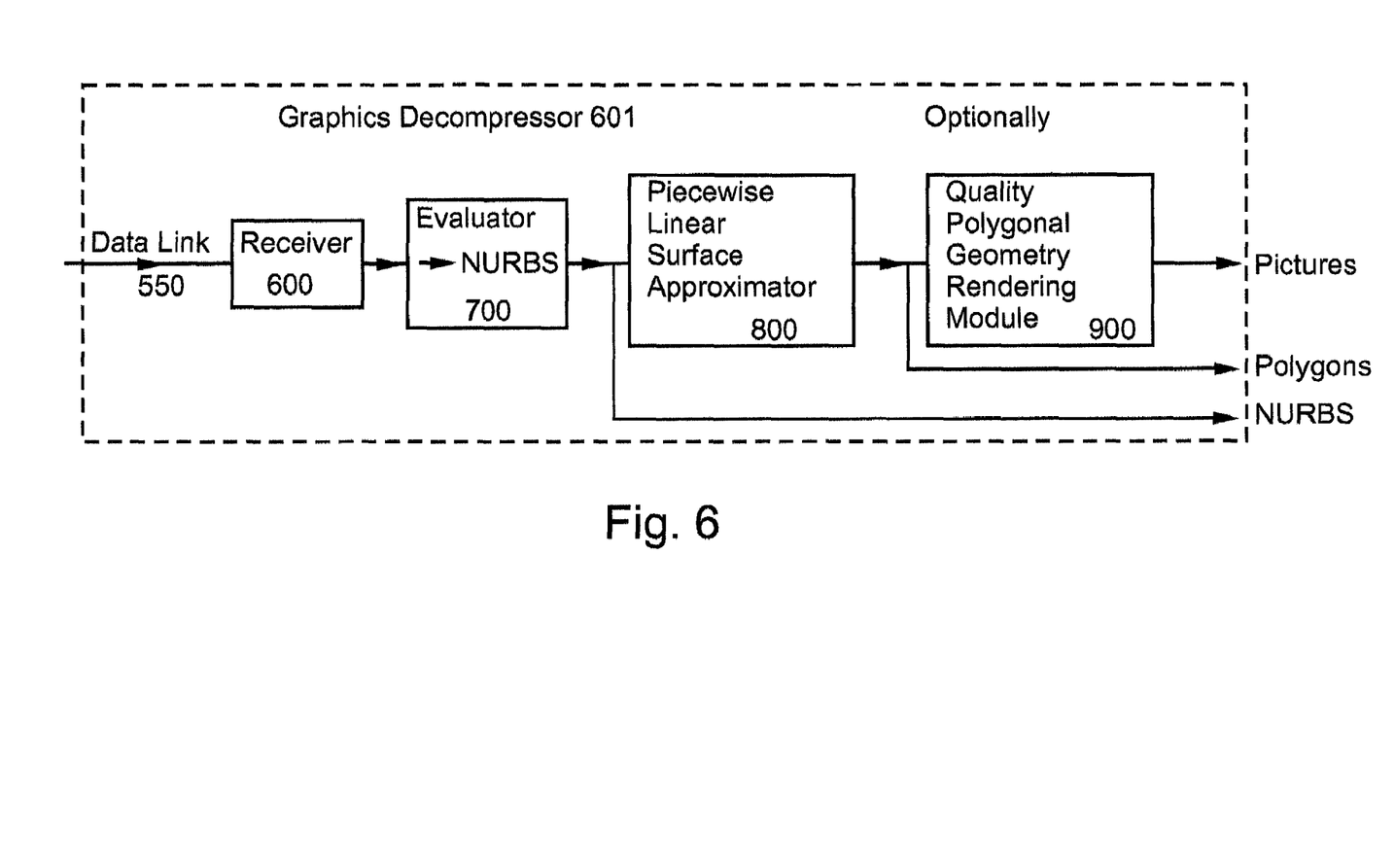
FIG. 6 is a functional block diagram of a graphics decompressor

Reference is now made to FIG. 6, which is a functional block diagram of a graphics decompressor 601, according to a second embodiment of the present invention. The graphics decompressor 601 comprises a receiver 600, a geometry evaluator 700 and optionally a piecewise linear surface approximator 800, and optionally, a polygonal geometry-rendering module 900, and may be used to decompress the compressed graphical description output from the graphical data compressor described above. The receiver 600 receives compressed graphical data originating from the graphical data compressor of the first embodiment via the link 550. The received compressed data is then transferred to a geometry evaluator 700, which decompresses the received compressed data. If the data comprises a matched predetermined shape or form, this is decompressed, and converted, typically into NURBS form. The NURBS form may be converted into polynomial form using the piecewise linear surface approximator 800.

One of the features of transmitting graphics data using a high level compressed form, is that the geometry may be approximated into piece-wise linear polygonal form at any desired resolution. This is advantageous, as the client is not constrained to any single polygonal approximation level, as is the case in much of the prior art where polygonal models are directly received. By allowing the client to decide on the level of piecewise linear accuracy required on the fly, dynamically deciding the quality of the scene required, based on the system capabilities and requirements, the client can strive for real time interactive display rates, within the limitation of the current computation power and real memory available. Thus an object that is far away or of marginal interest, may be displayed quite crudely for example. Such an approach is known as LOD (Level of Detail) control.

Exits from the decompressor are provided after the evaluator 700 and after the piecewise linear surface approximator 800 so that the piecewise linear surface approximator 800 and the quality polygonal geometry rendering module 900 stages can be left out as required.

Figure 7:
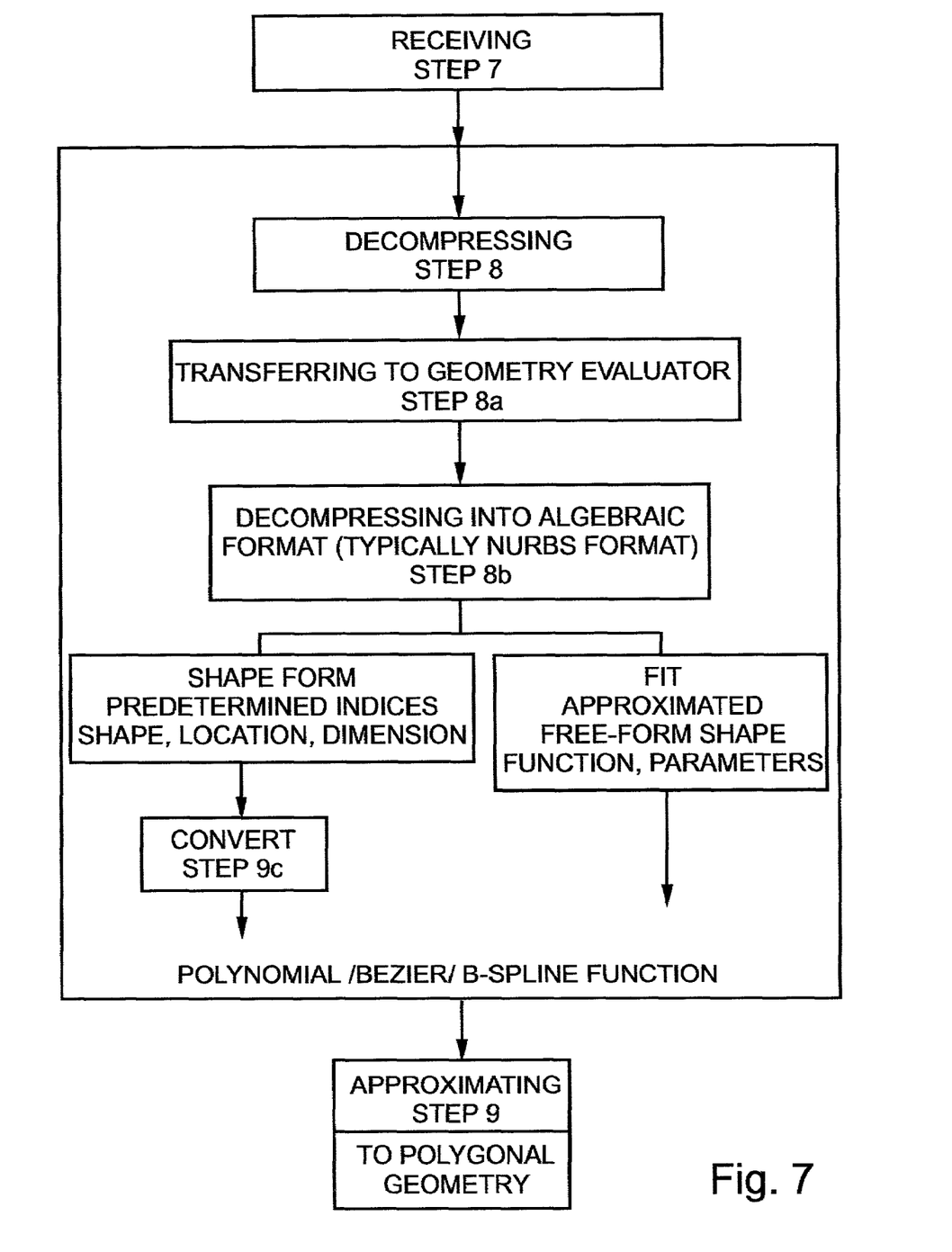
FIG. 7 is a flow diagram illustrating the process for the decompression of compressed arbitrary graphical data.

We refer now to FIG. 7, which is a flow diagram that illustrates the process for the decompression of compressed arbitrary graphical data corresponds to the second embodiment. The decompression process comprises the following steps:

STEP 7—Receiving compressed graphical data

The compressed graphical data that originates from the graphical data compressor of the first embodiment is received via the link 550.

STEP 8—Decompressing the received data

The received compressed data is then transferred (Step 8A) to a geometry evaluator, which decompresses (Step 8B) the received compressed data, typically into NURBS format. Typically the data is then converted (Step 8C) into piecewise polynomial and/or rational Bezier or B-spline surfaces. The piecewise polynomial and/or rational Bezier or B-spline surfaces are then passed to the approximator for approximating (Step 9).

STEP 9—Approximating

The polynomial and/or rational Bezier or B-spline surfaces are approximated as piecewise linear surfaces, using the approximator. In this form, they may be converted into polygonal geometry.

As mentioned above in respect of step 3, if a shape is not recognized it is passed on to the transmission in its unmodified polygonal, usually NURBs format. However, in a preferred embodiment a number of possibilities may be used, in a further processing step, to compress, or render more concise, the polygonal format.

The piecewise polynomial and/or rational form is generally non-unique and thus is susceptible to being further optimized, for example using the following:

1 Ensuring that the representation is minimal. I.e. the degree(s) of freeform is/are the minimal that is actually necessary for correct reproduction. Suitable degree reduction schemes are disclosed in Les Piegl and Wayne Tiller. Algorithm for degree reduction of B-spline curves. Computer-aided Design, 27(2), pp. 101-110 (1995). the contents of which are hereby incorporated by reference.

2. All interior knots (for piecewise polynomials) and rational forms that are not required for accurate reproduction are removed. Knots are not required, if by removing them, the shape is unmodified. Such knots are typically introduced in a refinement process. Details of how to achieve such removal are available in T. Lyche and V. Morken. Knot removal for parametric B-spline curves and surfaces. Computer Aided Geometric Design, 4(3), pp. 217-230 (1987) the contents of which are hereby incorporated by reference.

3 Knot sequences are, in many cases, arranged in specific patterns that reappear, for example patterns known as uniform open or uniform float. Indexing, using such patterns, may yield a certain amount of compression and in some cases may reduce an entire knot sequence into a single index.

4 If the application permits approximations, which is to say that accurate reproduction is not necessary, then least squares approximation could be employed to yield a similar, yet more compact equivalent freeform shape.

Figure 8:
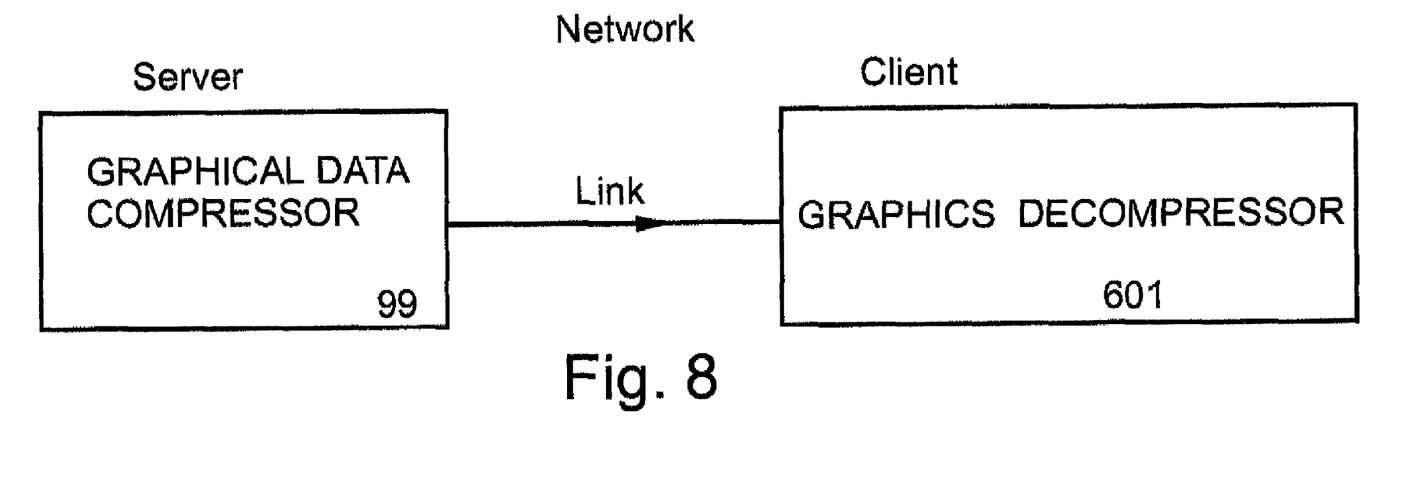
FIG. 8 is a functional block diagram of a system comprising a graphical compressor linked to a graphics decompressor by a data link.

Reference is now made to FIG. 8, which is a functional block diagram of a system comprising a graphical compressor 99 at a server linked to a graphics decompressor 601 by a data link across a network, according to an embodiment of the present invention. The embodiment provides a system for the efficient transmission of graphical data between clients, particularly for World Wide Web applications. The system is a combination of the first and second embodiments comprising a graphical data compressor 99 supported by a first computer, a graphics decompressor 601 supported by a second computer, and the link 550 connecting them. The link may be a network of ground lines, or the ether. It may be a LAN, a WAN or particularly the Internet.

Generally, in the above embodiments, the bulk of the processing takes place at the compression end and decompression is considerably less demanding in terms of processor power. Thus, the embodiments are particularly useful in server based applications and the like where compression is carried out once at a single server-based location and decompression is carried out at multiple locations.

The above embodiments may advantageously be combined with regular compression techniques such as Lempel-Ziv-based techniques.

Thus the present embodiments comprises an apparatus and corresponding method for compressing arbitrary data for transmission over a data link, an apparatus and corresponding method for decompressing the compressed data and a system and corresponding process for compressing arbitrary data for transmission over a data link, and its subsequent decompression.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof, which would occur to persons skilled in the art upon reading the foregoing description.

In the following claims, the term 'comprise', and variations thereof, such as 'comprising' and 'comprised' imply that the invention includes the elements listed, but is not necessarily restricted to those elements, and may additionally comprise other elements.

The invention claimed is:

1. A graphical data-compressor for compression of received, arbitrary graphical data for subsequent transmission, said graphical data-compressor comprising:
    an input for reception of said received arbitrary graphical data,
    an analyzer linked to said input and operable for analysis of said received arbitrary graphical data into constituent geometrical parts, where at least some of said constituent geometric parts comprise predetermined shapes and forms,
    a three-dimensional scene describer, linked to said analyzer and configured for description of said at least some of said constituent geometrical parts as a procedural description of said received arbitrary graphical data, said three dimensional scene describer further being configured such that said procedural description comprises a high level three dimensional functional form representing one of said constituent geometrical parts, and
    a transmitter linked to said procedural scene describer for transmission of said procedural description.

2. A graphical data-compressor as claimed in claim 1, further comprising an indexer positioned between said analyzer and said transmitter, for indexing said analytic description into an indexed description.

3. A grapbical data-compressor as claimed in claim 1, wherein said arbitrary graphical data is in a format selected from a polygonal graphic representation, a point cloud, an ordered piecewise mesh, or (piecewise) polynomial and rational forms and polynomial, rational and freeform functions.

4. A graphical data-compressor as claimed in claim 1 wherein said analyzer for analysis of said graphical data into constituent geometrical parts comprises a pattern matcher.

5. A graphical data-compressor as claimed in claim 1, wherein said constituent geometrical part is a predetermined shape, and said analytic description comprises a functional representation of said predetermined shape.

6. A graphical data-compressor as claimed in claim 1, wherein said functional representation comprises a basic underlying shape together with parameters.

7. A graphical data-compressor as claimed in claim 6, wherein said received arbitrary input data comprises a plurality of data points in space.

8. A graphical data-compressor as claimed in claim 7, wherein said input comprises an applicator for applying a surface fitting function to fit said plurality of data points in space, thereby to represent said plurality of data points in a format suitable for said analyzer.

9. A graphical data-compressor as claimed in claim 5, wherein said predetermined shape is selected from any one of a group comprising lines, curves, planar freeform surfaces, surfaces of revolution, spherical faces, conical faces, cylindrical faces, torroidal faces, ruled surfaces, extrusion surfaces, sweep surfaces, additive combinations thereof and trimmed combinations thereof.

10. A graphical data-compressor as claimed in claim 9 wherein said scene describer is operable to select said predetermined shape for said constituent geometrical part by analysis of said constituent geometric part to determine fulfillment of conditions associated with said predetermined shape.

11. A graphical data-compressor as claimed in claim 9, wherewith said predetermined shape is modifiable by trimming.

12. A graphical data-compressor as claimed in claim 5, wherewith said procedural description comprises at least a label of an underlying shape and parameters for adapting said underlying shape to reconstruct an original shape.

13. A graphical data compressor as claimed in claim 12, wherein said parameters comprise at least one of a group comprising an orientation, a scale, dimensional parameters and a location.

14. A graphical data-compressor as claimed in claim 13 wherewith said label is an index.

15. A graphics decompressor, comprising:
a receiver for reception of arbitrary graphical data, analyzed into constituent geometrical parts, where at least some of said constituent geometric parts comprise predetermined shapes and forms, and are described in a three dimensional functional form; and
a three-dimensional geometry evaluator, following said receiver, configured for evaluation of said graphical data in respect of a predetermined set of shapes and forms stored at said decompressor; and
a piecewise linear surface approximator following said geometry evaluator, configured for reconstruction of said evaluated data on a piecewise basis, into geometrical entities.

16. A graphics decompressor as claimed in claim 15, wherein said compressed functional form comprises elements having a basic shape associated with parameters.

17. A graphics decompressor as claimed in claim 16, wherein said reconstruction into geometrical entities is at a selectable resolution level.

18. A graphics decompressor as claimed in claim 17, said resolution level being selectable in accordance with a context of the data within a scene.

19. A graphics decompressor as claimed in claim 18, said context being a relationship of the data to a background and a foreground within the scene.

20. A graphics decompressor as claimed in claim 17, said selectable resolution level being determinable by available computer resources.

21. A graphics decompressor as claimed in claim 17, said available computer resources being any one of a group comprising memory availability, processor capability, and available processing time.

22. A graphics decompressor as claimed in claim 16, wherein said predetermined shape is selected from a list comprising lines, curves, planar freeform surfaces, surfaces of revolution, spherical faces, conical faces, cylindrical faces, torroidal faces, ruled surfaces, extrusion surfaces and sweep surfaces.

23. A graphics decompressor as claimed in claim 15 wherein each of said predetermined shape and form in said set is trimmable with a further predetermined shape and form from said set.

24. An analytic form describer for describing constituent geometrical parts of arbitrary graphical data as an analytic description, said analytic form describer comprising:
a register of predetermined shapes and forms, each shave or form being associated with an analytic description, and
an analytic form fitter configured for associating said predetermined shapes and forms with said geometrical parts, said analytic form fitter further configured to fit said constituent geometrical parts of arbitrary graphical data with functions selected from a group comprising Bezier freeform functions, B-spline freeform functions, NURBS, piecewise polynomial equations and rational equations whereby said analytic form fitter is usable to provide a respective analytic description and a description such that a corresnonding predetermined form is modifiable using a respective selected function to recover a respective constituent geometric part.

25. An analytic form describer as claimed in claim 24, wherein said predetermined shapes and forms are selected from a group comprising lines, circles, planar surfaces, spherical surfaces, conical surfaces, cylindrical surfaces, torroidal surfaces, surfaces of revolution, ruled surfaces, extrusion surfaces and sweep surfaces, and additive and trimmed combinations thereof.

26. A system for, analysis, compression, transmission and decompression of arbitrary graphical data, the system comprising:
a graphical data-compressor for compression of received, arbitrary graphical data, said graphical data-compressor comprising:
an input for reception of arbitrary graphical data,
a three dimensional analyzer, linked to said input, and configured to analyze said received arbitrary graphical data into constituent geometrical parts, where at least some of said constituent geometric parts comprise predetermined shapes and forms,
a describer, linked to said analyzer, configured to provide a description of said constituent geometrical parts as a procedural description, where said procedural description comprises at least one high level three dimensional functional form representing at least one of said constituent geometrical parts; and
a transmitter, linked to said analyzer, for transmission of said procedural description over a data link;
said system further comprising a graphical data decompressor for decompression of said procedural description into geometric entities, the decompressor comprising:
a receiver for reception of said procedural description from said data link, and
a geometry evaluator configured to evaluate said procedural description in terms of high-level functional forms, thereby to decompress said compressed graphical data descriptions.

27. A system as claimed in claim 26, further comprising an indexer linked between said analyzer and said transmitter, said indexer for indexing said analytic description into an indexed description.

28. A system as claimed in claim 26, wherein said decompressor further comprises a piecewise linear surface approximator.

29. A system as claimed in claim 26, wherein said data link is selected from a group comprising; a LAN, WAN, the Internet, a dedicated land link, a dedicated link through the atmosphere, a radio-wave link, and a microwave link.

30. A method for compressing arbitrary graphical data, comprising:
analyzing said arbitrary graphical data into constituent geometrical parts, where at least some of said constituent geometric parts comprise predetermined shapes and forms,
describing said constituent geometrical parts a procedural description for formation of said constituent geometrical parts of said arbitrary graphical data, where said procedural description for formation of said constituent geometrical part comprises a at least one high level three dimensional functional form representing at least one of said constituent geometrical parts such that said constituent geometrical parts are recoverable by applying said high level three dimensional functional form to said procedural description; and transmitting said procedural description.

31. A method for compressing arbitrary graphical data as claimed in claim 30, comprising indexing said procedural description into an indexed description prior to transmission.

32. A method for compressing arbitrary graphical data as claimed in claim 30, wherein said arbitrary graphical data is received as a representation selected from a polygonal graphic representation, a point cloud representation and an ordered piecewise linear mesh.

33. A method for compressing arbitrary graphical data as claimed in claim 30, wherein said analyzing said arbitrary graphical data into constituent geometrical parts comprises pattern matching.

34. A method for compressing arbitrary graphical data from a first computer as claimed in claim 30, wherein said describing comprises representing by procedural representation.

35. A method for compressing arbitrary graphical data as claimed in claim 30, wherein said arbitrary geometrical data comprises a plurality of data points.

36. A method for compressing arbitrary graphical data as claimed in claim 30, wherein said describing comprises matching with a predetermined shape.

37. A method for compressing arbitrary graphical data as claimed in claim 36, wherein said matching with a predetermined shape comprises matching with a shape selected from a group comprising: lines, curves, planar freeform surfaces, surfaces of revolution, spherical faces, conical faces, cylindrical faces, torroidal faces, ruled surfaces, extrusion surfaces and sweep surfaces and additive combinations thereof.

38. A method for compressing arbitrary graphical data as claimed in claim 36, wherein said matching further comprises modifying said predetermined shape by trimming.

39. A method for compressing arbitrary graphical data as claimed in claim 30, wherewith said compressing comprises encoding as a label and parameters.

40. A method for compressing arbitrary graphical data as claimed in claim 39, wherewith said encoding further comprises labeling with a label selected from a predetermined index of labels.

41. A method for decompressing a procedural description of graphical data, said procedural description being in terms of high-level functional forms and associated parameters such that said graphical data is recoverable by applying in said procedural description to said high level functional forms modified by said associated parameters, the method comprising:

carrying out said recovery by evaluating said procedural description in terms of said plurality of high-level functional forms, and wherein said functional forms are selected from a group comprising: Bezier freeform functions, B-spline freeform functions, NURBS, piecewise polynomial equations and rational equations, said parameters being parameters of said functional forms; and generating geometric entities using said evaluation thereby to recover originally compressed shapes and forms.

42. A method for decompressing a procedural description of graphical data as claimed in claim 41, wherein said generating comprises converting said evaluated procedural format into a piecewise linear surface approximation.

43. A method for decompressing a procedural description of graphical data as claimed in claim 42, further comprising converting said piecewise liner surface approximation into polygonal geometry.

44. A graphical data-compressor for compression of received, arbitrary graphical data for subsequent transmission, said graphical data-compressor comprising:

an input for reception of said received arbitrary graphical data, an analyzer linked to said input and operable for analysis of said received arbitrary graphical data into constituent geometrical parts, where at least some of said constituent geometric parts comprise predetermined shapes and forms, a three dimensional scene describer, linked to said analyzer and configured for description of said at least some of said constituent geometrical parts as a procedural description of said received arbitrary graphical data the three dimensional scene describer further being configured such that said procedural description comprises a high level three dimensional functional form representing at least one of said constituent geometrical parts; and a geometrical part compressor operatively associated with said scene describer and said analyzer, for reduction of constituent geometric parts not described by said describer, into a reduced quantity of data, such that both three dimensional geometric data which corresponds to said predetermined data and which does not correspond to said predetermined data is compressible.

45. A graphical data compressor according to claim 44, wherein said geometrical part is expressible as at least one spline having knots and wherein said geometrical part compressor comprises a knot remover for identifying and removing knots having no effect on reproduction of the part.

46. A graphical data compressor according to claim 44, wherein said geometrical part is expressible as at least one spline having knots, the geometrical part compressor having a pattern identifier for identifing patterns of knots and an indexer for replacing each identified pattern with an index.

47. A graphical data compressor according to claim 44, the geometrical part compressor comprising a least squares approximator reducing said geometrical part into a least squares approximation.

48. A graphical data compressor according to claim 44, the geometrical part compressor having a degree of reduction identifier for identifying redundancy and a reducer for reducing said constituent geometric parts to give a minimal polynomial degree required for correct reproduction of said constituent geometric parts.

49. A graphical data-compressor for compression of received, arbitrary three dimensional (3D) graphical data for subsequent transmission, said graphical data-compressor comprising:

an input for reception of said received arbitrary 3D graphical data, an analyzer linked to said input and operable for analysis of said received arbitrary 3D graphical data into constituent geometrical parts, where at least some of said constituent geometric parts comprise predetermined shapes and forms, a three dimensional scene describer, linked to said analyzer and configured for description of said at least some of said constituent geometrical parts as a procedural description of said received arbitrary 3D graphical data, the three dimensional scene describer further being configured such that said procedural description comprises a high level three dimensional functional form representing one of said constituent geometrical parts; and a transmitter linked to said procedural scene describer for transmission of said procedural description.

* * * * *